(12) United States Patent
Bousselot (10) Patent No.: US 11,316,268 B2
(45) Date of Patent: Apr. 26, 2022

(54) METHOD FOR ANTENNA BEAM AND NULL STEERING UNDER HIGH PLATFORM DYNAMICS

(71) Applicant: Rockwell Collins, Inc., Cedar Rapids, IA (US)

(72) Inventor: Matthew D. Bousselot, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 14 days.

(21) Appl. No.: 16/449,830

(22) Filed: Jun. 24, 2019

(65) Prior Publication Data

US 2021/0234266 A1    Jul. 29, 2021

(51) Int. Cl.
*H01Q 3/24*     (2006.01)
*G01S 3/48*     (2006.01)
*G01S 5/12*     (2006.01)
*G01S 13/87*    (2006.01)
*G01S 19/49*    (2010.01)

(52) U.S. Cl.
CPC ............... *H01Q 3/24* (2013.01); *G01S 3/48* (2013.01); *G01S 5/12* (2013.01); *G01S 13/878* (2013.01); *G01S 19/49* (2013.01)

(58) Field of Classification Search
CPC .. H01Q 3/00; H01Q 3/24; H01Q 3/26; H01Q 3/2611; H01Q 3/005; G01S 5/02; G01S 5/021; G01S 5/0221; G01S 5/02213; G01S 5/0242; G01S 5/12; G01S 13/878; G01S 3/48; G01S 19/49
USPC ......................................................... 343/754
See application file for complete search history.

(56) References Cited

U.S. PATENT DOCUMENTS

| | | | | |
|---|---|---|---|---|
| 6,023,242 A | * | 2/2000 | Dixon ............... | H01Q 21/065 |
| | | | | 342/359 |
| 6,075,484 A | * | 6/2000 | Daniel ................ | G01S 3/06 |
| | | | | 342/372 |
| 8,930,047 B2 | * | 1/2015 | Robinson ............ | H01Q 3/00 |
| | | | | 701/13 |
| 9,147,935 B2 | * | 9/2015 | Keidar ................ | H01Q 1/245 |
| 10,771,135 B2 | * | 9/2020 | Sheldon ............. | H04B 7/0617 |

(Continued)

FOREIGN PATENT DOCUMENTS

| | | |
|---|---|---|
| EP | 3757621 A1 | 12/2020 |
| WO | 2013023187 A1 | 2/2013 |
| WO | 2015165502 A1 | 11/2015 |

OTHER PUBLICATIONS

Search Report for European Application No. 20181678.2 dated Dec. 30, 2020, 2 pages.

*Primary Examiner* — Hai V Tran
(74) *Attorney, Agent, or Firm* — Suiter Swantz pc llo (57) ABSTRACT

An electronically steerable antenna includes an embedded antenna processor and orientation sensor, separate from any orientation sensor within a corresponding GPS receiver. The orientation sensor tracks orientation changes in the mobile platform including the electronically steerable antenna, and an antenna processor updates beams and nulls produced by the antenna to track a real-world location based on the orientation changes. The embedded antenna processor periodically compares the orientation data from the embedded orientation sensor with orientation data from systems aboard the mobile platform to calibrate.

14 Claims, 7 Drawing Sheets

(56) References Cited

U.S. PATENT DOCUMENTS

2013/0040655 A1* 2/2013 Keidar ................... H01Q 1/246
                                                                  455/456.1
2019/0372233 A1* 12/2019 Stokes ................. H01Q 13/106

* cited by examiner

METHOD FOR ANTENNA BEAM AND NULL STEERING UNDER HIGH PLATFORM DYNAMICS

BACKGROUND

Advances in jamming technology are a threat to the operation of the Global Positioning System (GPS) and other data communication systems. Consequently, many GPS receivers are augmented with anti-jam antennas. These anti-jam antennas contain complex beamforming and nullforming algorithms. As these algorithms become more sophisticated, the resulting beams and nulls must be pointed with increased accuracy and speed. At the same time, high dynamics in ground and air vehicles make it increasingly difficult to maintain accurate pointing to an absolute direction. Any processing time or latency of data translates to pointing error when the platform moves and degraded performance of the beamforming and nullforming algorithms. Absolute earth-referenced pointing is presently done via coupling a GPS receiver and an inertial sensor (IMU) in highly integrated systems. However conventional GPS-IMU integration fails to provide the accuracy and low latency required when they are applied to federated systems.

SUMMARY

In one aspect, embodiments of the inventive concepts disclosed herein are directed to an electronically steerable antenna including an embedded antenna processor and orientation sensor, separate from any orientation sensor within a corresponding navigation or pointing system. The orientation sensor tracks orientation changes in the mobile platform including the electronically steerable antenna, and the embedded antenna processor updates beams and nulls produced by the antenna to track a real-world location based on the orientation changes.

In a further aspect, the embedded antenna processor periodically compares the orientation data from the embedded orientation sensor with orientation data from systems aboard the mobile platform to calibrate.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which.

DETAILED DESCRIPTION

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to an electronically steerable antenna including an embedded antenna processor and orientation sensor, separate from any orientation sensor within a corresponding navigation or pointing system. The orientation sensor tracks orientation changes in the mobile platform including the electronically steerable antenna, and the embedded antenna processor updates beams and nulls produced by the antenna to track a real-world location based on the orientation changes.

Figure 1:
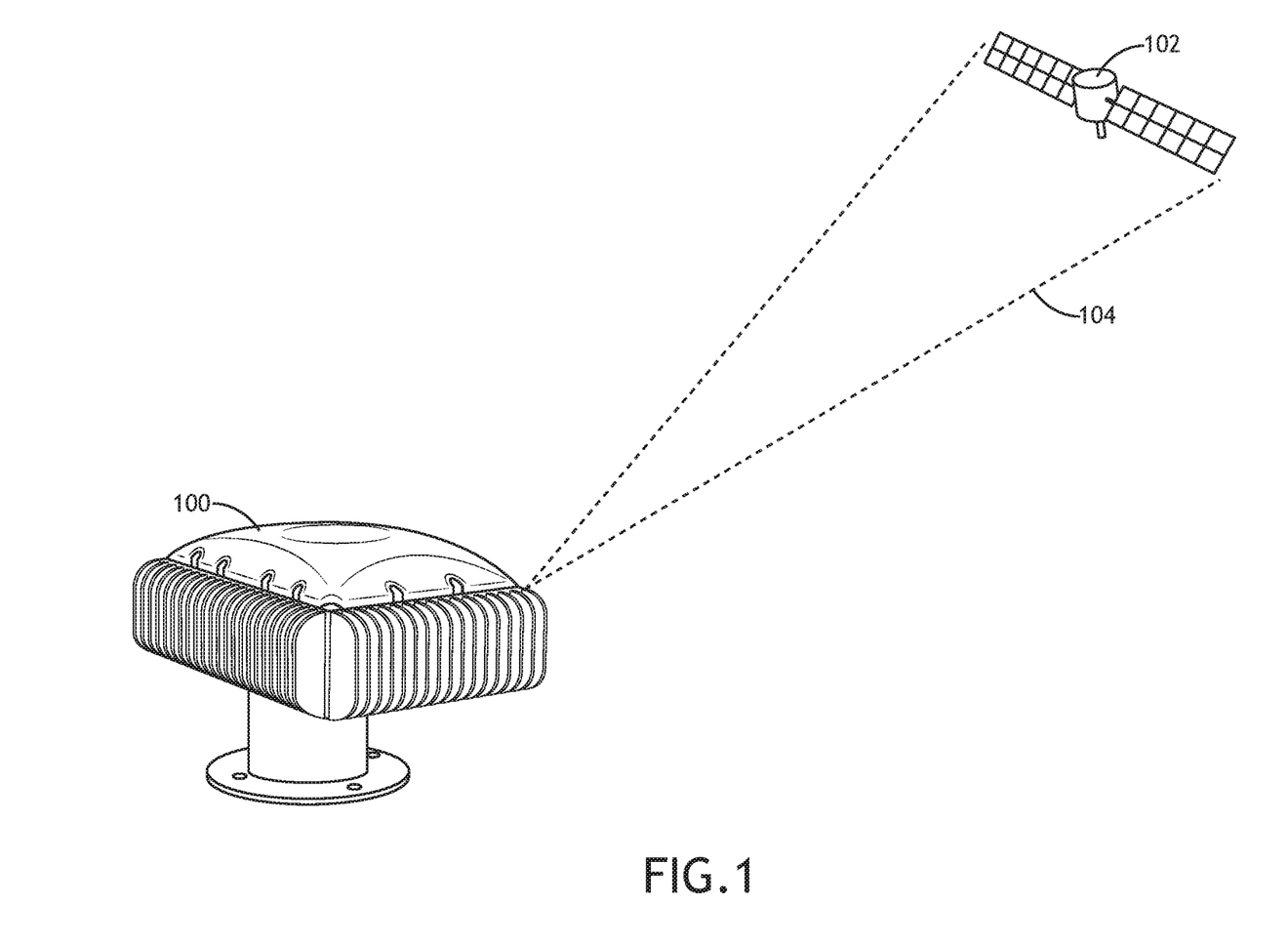
FIG. 1 shows a perspective view of an electronically steerable antenna according to an exemplary embodiment.

Referring to FIG. 1, a perspective view of an electronically steerable antenna 100 according to an exemplary embodiment is shown. The antenna 100 is configured for receiving signals from, for example, a space-based vehicle 102 via directional beam and null forming. In at least one embodiment, the antenna 100 may comprise an electronically steerable antenna comprising an array of radiating elements configured to produce a directional beam 104 and suppress transmission (null) outside the directional beam 104 via signals to the array of radiating elements to create constructive and destructive interference. In such an embodiment, the signals to the array of radiating elements may be altered such as via phase shifting to change the directionality of the directional beam 104.

While embodiments described herein may refer specifically to electronically steerable antennas, any antenna technology capable of azimuth and elevation manipulation may be utilized.

Figure 2:
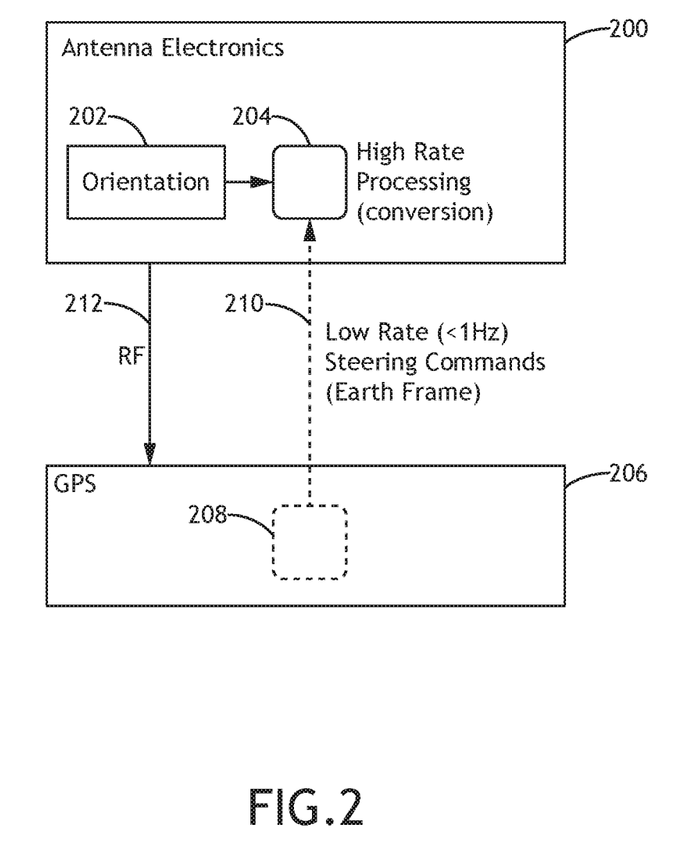
FIG. 2 shows a block diagram of an electronically steerable antenna according to an exemplary embodiment.

Referring to FIG. 2, a block diagram of an electronically steerable antenna 200 according to an exemplary embodiment is shown. The antenna 200 includes an orientation sensor 202 connected to an antenna processor 204. The orientation sensor 202 continuously tracks orientation changes of the antenna 200 (and corresponding mobile platform). In at least one embodiment, the orientation sensor 202 tracks at least two dimensions of orientation deviation. The orientation sensor 202 delivers the tracked orientation changes to the processor 204 which computes a change to beam and null directionality of radiating elements in the antenna 200.

In at least one embodiment, the antenna 200 is in data communication with GPS receiver 206 including a GPS processor 208 that determines the location of the corresponding mobile platform in space. The GPS processor 208 periodically sends the determined location to the antenna processor 204 which incorporates such location data into the beam and null directionality computations.

Orientation changes may occur relatively rapidly compared to location changes. Therefore, an orientation sensor 202 within the antenna 200 allows the antenna processor 204 to account for orientation changes rapidly, even when the data connection between the antenna processor 204 and the GPS processor 208 is slower than the rate of such orientation changes. Furthermore, location changes being slower, the same data connection would be sufficient for the GPS processor 208 to update the antenna processor 204 with such location changes.

Figure 3:
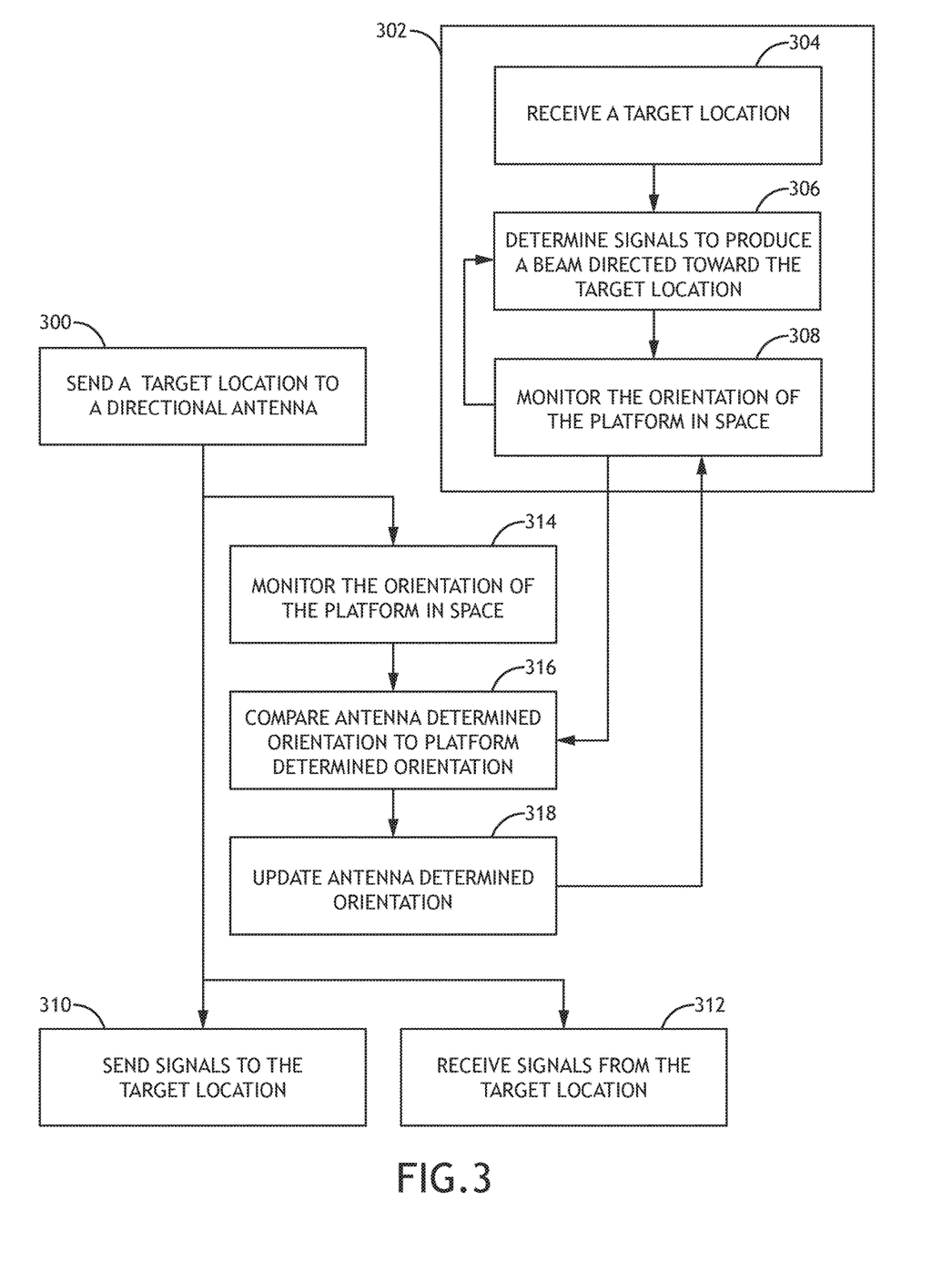
FIG. 3 shows a flowchart of a method according to an exemplary embodiment.

Referring to FIG. 3, a flowchart of a method according to an exemplary embodiment is shown. A mobile system provides 300 one or more target locations to an antenna processor 302. The target locations may comprise areas where a user wishes to send or receive signal or specifically exclude signals, or both. The antenna processor 302 receives 304 the one or more target locations and determines 306 signals to apply to one or more antenna radiating elements to produce directional beams and nulls corresponding to the one or more target locations. The antenna processor 302 includes or is connected to an antenna orientation sensor to monitor 308 the orientation of the platform and continuously apply orientation changes to the signal determination 306 process. The mobile system may then send 310 and receive 312 signals to the one or more target locations which are kept in the directional beam by the antenna processor 302.

In at least one embodiment, the mobile system contemporaneously monitors 314 the orientation of the platform. The mobile system may periodically receive orientation data from the antenna orientation sensor and compare 316 the orientation values to determine the accuracy of the antenna orientation sensor and potentially update 318 the antenna orientation sensor for future calculations.

Figure 4A:
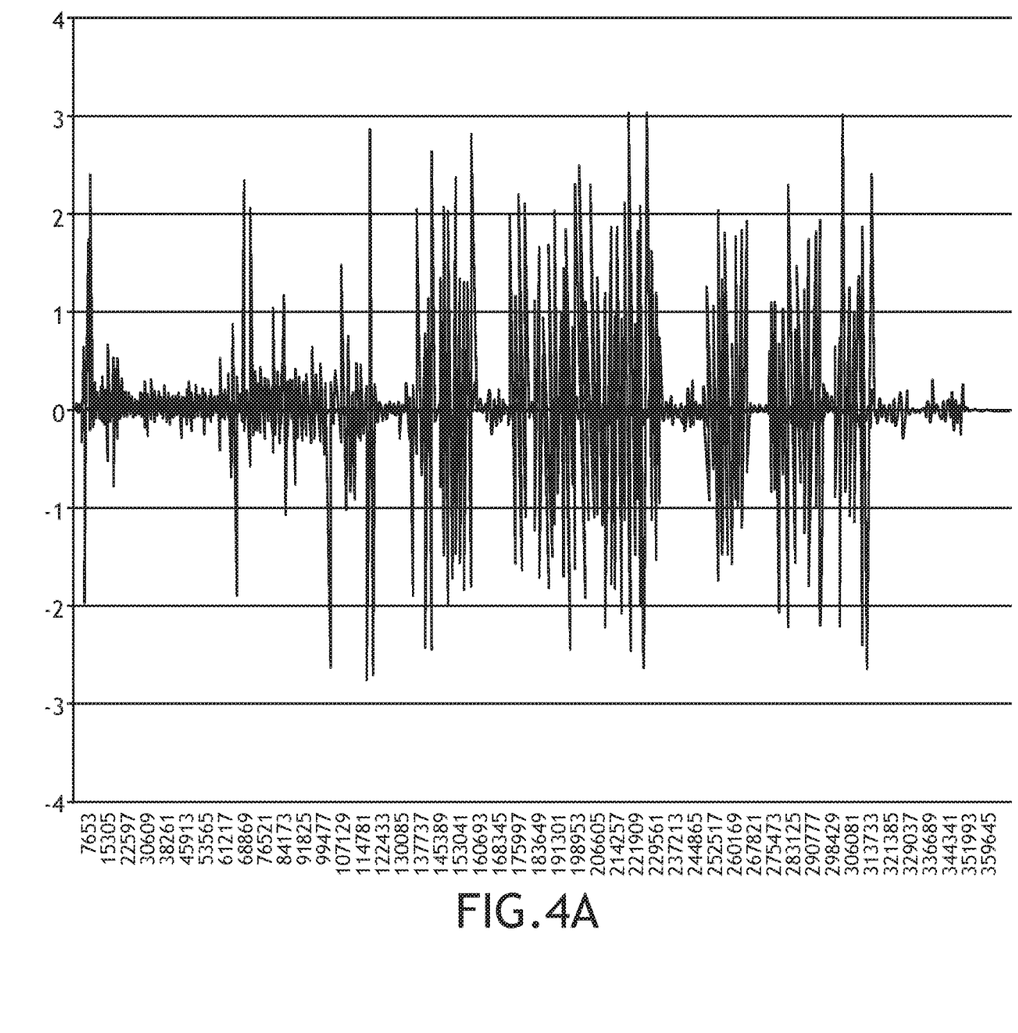
FIG. 4A shows a graph of noise produced by a federated system with orientation tracking external to the antenna.
Figure 4B:
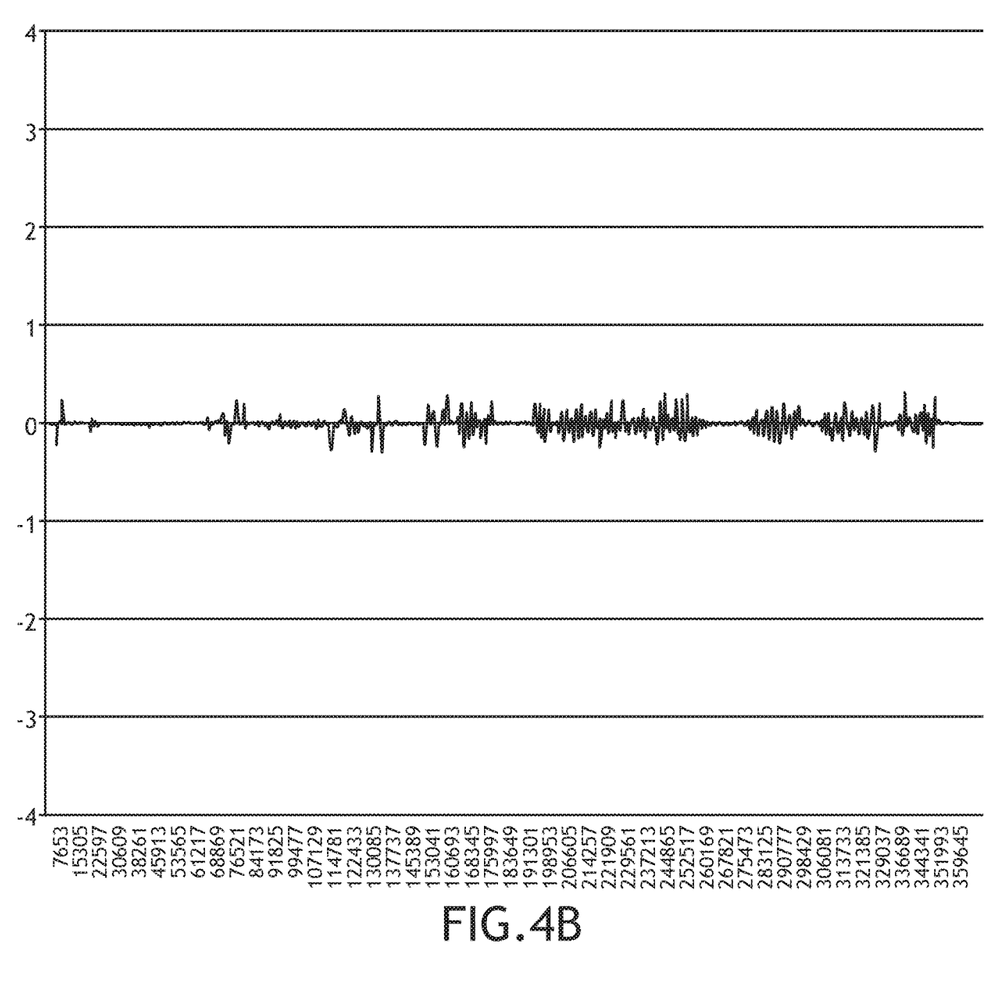
FIG. 4B shows a graph of noise produced by a federated system with orientation tracking internal to the antenna.

Referring to FIGS. 4A-4B, graphs of noise produced by a federated system with orientation tracking external and internal to the antenna are shown. In a federated system (non-integrated system wherein disparate components are in data communication such as through serial connections), where an orientation sensor is disposed in the navigation or pointing system and the navigation or pointing system is connected to the antenna via a slow data rate connection, orientation updates from one update cycle to the next (as in FIG. 4A) are large and noisy. Large, noisy orientation deviations result in lower overall signal strength and potentially lost signals in a hostile environment.

By contrast, in an integrated system where an orientation sensor is disposed in the antenna, orientation updates from one update cycle to the next (as in FIG. 4B) are much faster, resulting in higher overall signal strength.

Figure 5:
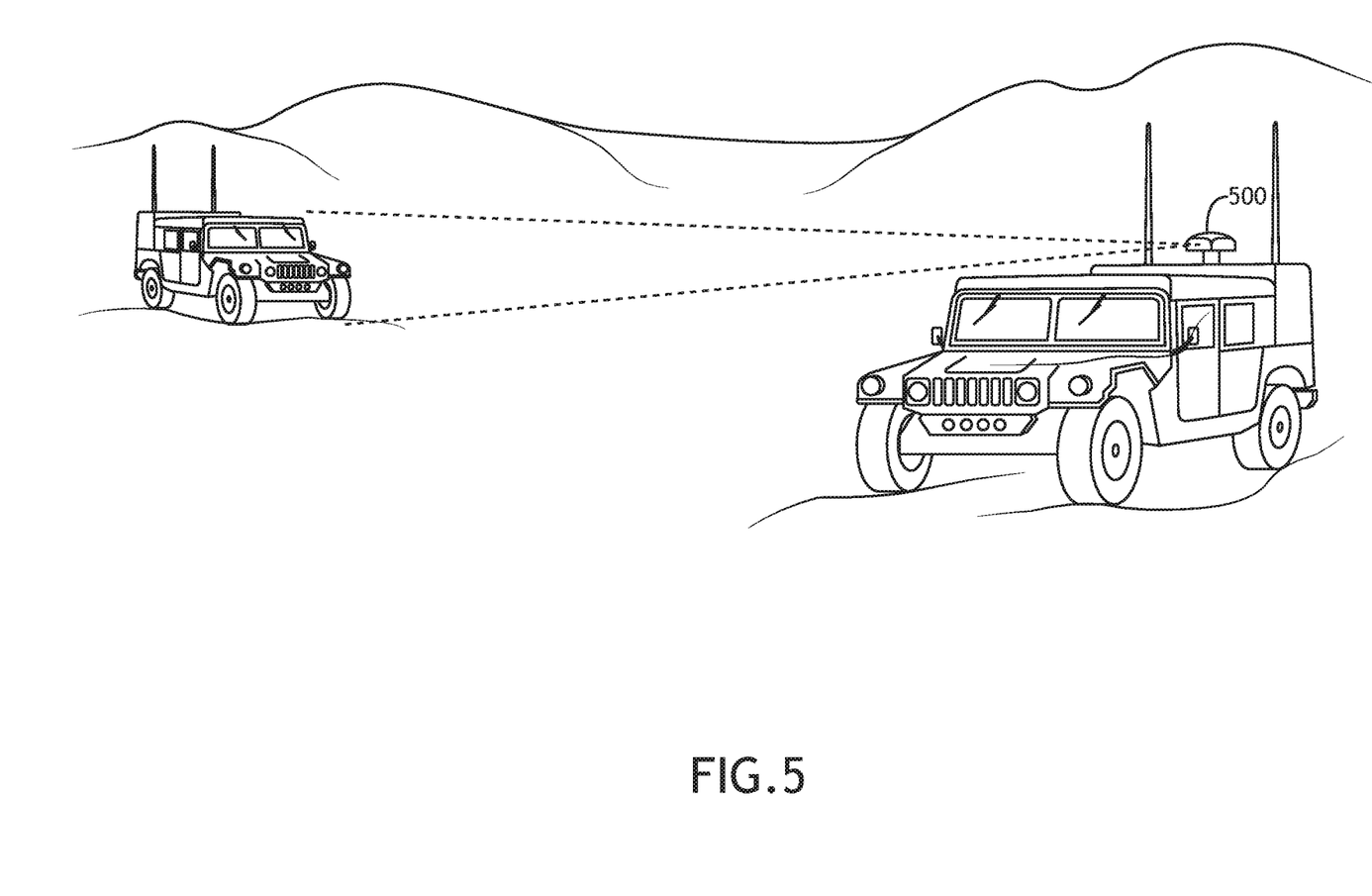
FIG. 5 shows an environmental view of a system including an exemplary embodiment.
Figure 6:
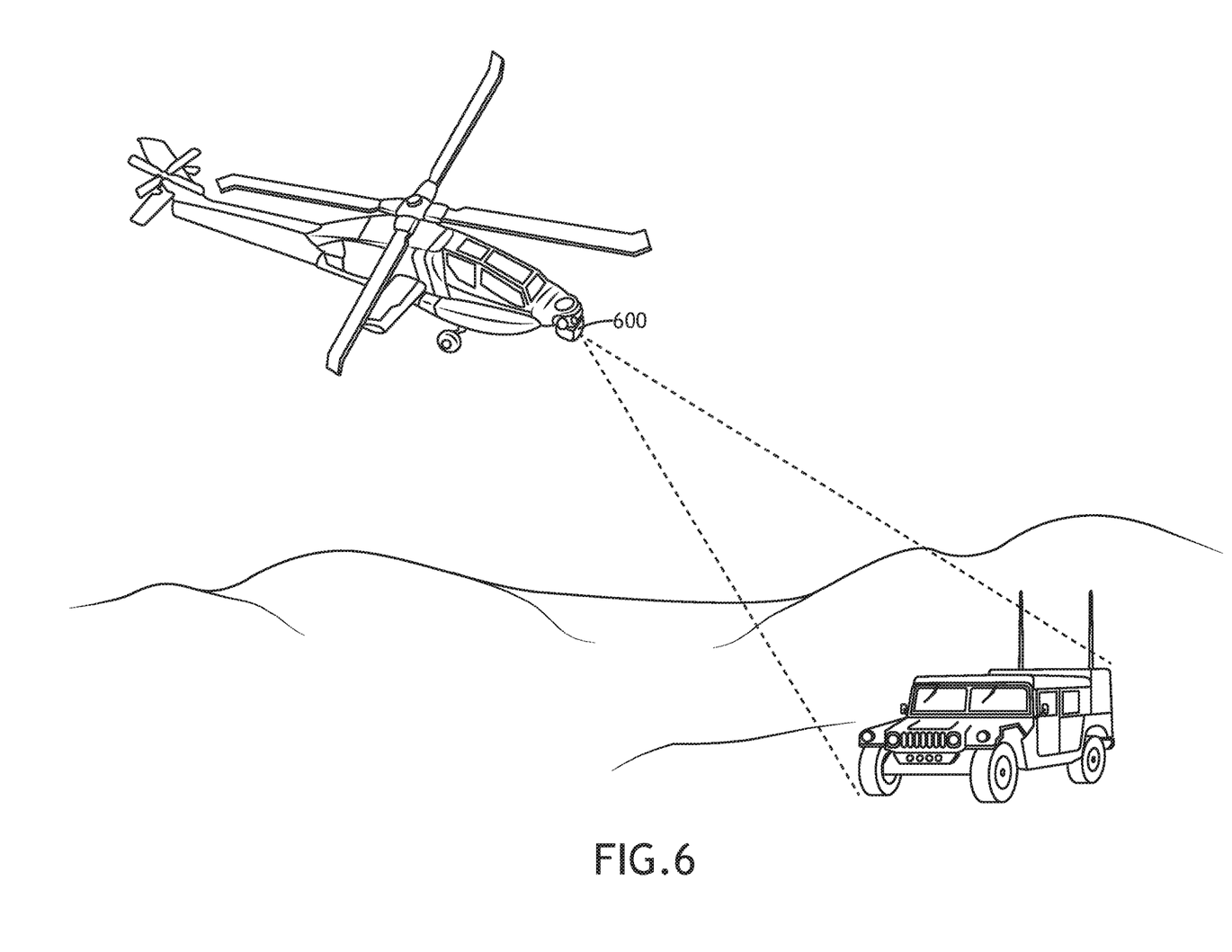
FIG. 6 shows an environmental view of a system including an exemplary embodiment.

Referring to FIGS. 5 and 6, environmental views of systems including an exemplary embodiment shown. Embodiments of the inventive disclosure may be incorporated into mobile platforms such as ground vehicles (FIG. 5) or aircraft (FIG. 6) including directional antennas 500, 600 with internal orientation sensors and processors.

It is believed that the inventive concepts disclosed herein and many of their attendant advantages will be understood by the foregoing description of embodiments of the inventive concepts disclosed, and it will be apparent that various changes may be made in the form, construction, and arrangement of the components thereof without departing from the broad scope of the inventive concepts disclosed herein or without sacrificing all of their material advantages; and individual features from various embodiments may be combined to arrive at other embodiments. The form herein before described being merely an explanatory embodiment thereof, it is the intention of the following claims to encompass and include such changes. Furthermore, any of the features disclosed in relation to any of the individual embodiments may be incorporated into any other embodiment.

What is claimed is:

1. A computer apparatus comprising:
   an electronically steerable antenna comprising:
      an antenna processor;
      a plurality of radiating elements; and
      an antenna orientation sensor in data communication with the antenna processor; and
   a platform system in data communication with the electronically steerable antenna, the platform system comprising a platform processor and a platform orientation sensor, the platform processor electronically configured to:
      send the target location to the antenna processor;
      receive a platform orientation deviation from the platform orientation sensor; and
      periodically send the platform orientation deviation to the antenna processor; and
   wherein the antenna processor is electronically configured to:
      receive a target location;

receive a null target location;
electronically configure the plurality of radiating elements to produce a directional beam directed toward the target location and produce a null directed at the null target location;
continuously receive an orientation deviation from the antenna orientation sensor;
continuously electronically reconfigure the plurality of radiating elements to alter the directional beam and null based on the orientation deviation;
receive the platform orientation deviation;
compare the platform orientation deviation to the orientation deviation; and
adjust the orientation deviation based on the comparison.

2. The computer apparatus of claim 1,
wherein:
the platform processor is further electronically configured to:
determine a new target location; and
send the new target location to the antenna processor; and
the antenna processor is further electronically configured to:
receive the new target location; and
electronically reconfigure the plurality of radiating elements to alter the directional beam based on the orientation deviation and the new target location.

3. The computer apparatus of claim 1, wherein the platform system is connected to the electronically steerable antenna with a data connection of not more than one hertz.

4. The computer apparatus of claim 1, wherein the antenna processor is further electronically configured to:
monitor a signal strength of an incoming signal corresponding to the directional beam;
recalibrate the antenna orientation sensor when the signal strength falls below a threshold.

5. The computer apparatus of claim 1, wherein the platform system comprises a global positioning system (GPS) receiver unconnected to the antenna orientation sensor.

6. A method comprising:
receiving a target location from a mobile platform processor by an antenna processor;
receiving a null target location from the platform processor by the antenna processor;
electronically configuring a plurality of radiating elements to produce a directional beam directed toward the target location and produce a null directed at the null target location;
continuously determining an orientation deviation based on a signal from an antenna orientation sensor disposed within an antenna housing;
continuously electronically reconfiguring the plurality of radiating elements to alter the directional beam and null based on the orientation deviation;
receiving a platform orientation deviation from a platform orientation sensor;
periodically sending the platform orientation deviation to the antenna processor;
comparing the platform orientation deviation to the orientation deviation; and
adjusting the orientation deviation based on the comparison.

7. The method of claim 6, further comprising:
determining a new target location by the mobile platform processor;
sending the new target location to the antenna processor; and
electronically reconfiguring the plurality of radiating elements to alter the directional beam based on the orientation deviation and the new target location.

8. The method of claim 6, wherein the mobile platform processor and antenna processor are configured to exchange steering commands at a data rate not more than one hertz.

9. The method of claim 6, further comprising:
monitoring a signal strength of an incoming signal corresponding to the directional beam via the antenna processor;
recalibrating the antenna orientation sensor when the signal strength falls below a threshold.

10. The method of claim 6, wherein the mobile platform processor is configured to determine a real-world location via a plurality of global positioning system (GPS) signals.

11. A mobile platform comprising:
an electronically steerable antenna comprising:
an antenna processor;
a plurality of radiating elements; and
an antenna orientation sensor in data communication with the antenna processor; and
a platform system in data communication with the electronically steerable antenna comprising a platform processor and a platform orientation sensor,
wherein:
the platform processor is electronically configured to:
send a target location to the antenna processor;
determine a new target location;
send the new target location to the antenna processor;
receive a platform orientation deviation from the platform orientation sensor; and
periodically send the platform orientation deviation to the antenna processor; and
the antenna processor is electronically configured to:
receive a target location;
receive a null target location;
electronically configure the plurality of radiating elements to produce a directional beam directed toward the target location and produce a null directed at the null target location;
continuously receive an orientation deviation from the antenna orientation sensor;
continuously electronically reconfigure the plurality of radiating elements to alter the directional beam and null based on the orientation deviation;
receive the new target location;
electronically reconfigure the plurality of radiating elements to alter the directional beam based on the orientation deviation and the new target location;
receive the platform orientation deviation;
compare the platform orientation deviation to the orientation deviation; and
adjust the orientation deviation based on the comparison.

12. The mobile platform of claim 11, wherein the platform system is connected to the electronically steerable antenna with a data connection of not more than one hertz.

13. The mobile platform of claim 11, wherein the antenna processor is further electronically configured to:
monitor a signal strength of an incoming signal corresponding to the directional beam;
recalibrate the antenna orientation sensor when the signal strength falls below a threshold.

14. The mobile platform of claim 11, wherein the platform system comprises a global positioning system (GPS) receiver unconnected to the antenna orientation sensor.

\* \* \* \* \*